United States Patent [19]

Baird et al.

[11] Patent Number: 4,478,858

[45] Date of Patent: Oct. 23, 1984

[54] INSTANT COFFEE CONTAINING PACKET AND METHOD OF FORMING

[75] Inventors: James C. Baird, Cincinnati; Cornelis H. Japikse, Wyoming; Richard F. Kussin, Cincinnati, all of Ohio

[73] Assignee: The Procter & Gamble Company, Cincinnati, Ohio

[21] Appl. No.: 346,828

[22] Filed: Feb. 8, 1982

[51] Int. Cl.³ .................. B65D 85/00; B65D 81/00; B65D 65/14; B65D 65/40

[52] U.S. Cl. ................................ 426/126; 206/205; 206/484; 229/3.5 MF; 426/106; 426/410; 426/594; 53/455; 53/474; 53/411

[58] Field of Search ............. 426/126, 410, 594; 206/205, 484; 229/3.5 MF; 53/455, 474, 411

[56] References Cited

U.S. PATENT DOCUMENTS

| | | | |
|---|---|---|---|
| 1,247,906 | 11/1917 | Tully . | |
| 2,357,258 | 8/1944 | Harris | 426/124 |
| 2,805,164 | 9/1957 | Doppler | 99/171 |
| 3,077,405 | 2/1963 | Clinton et al. | 426/388 |
| 3,078,201 | 2/1963 | Christie | 426/126 |
| 3,136,468 | 6/1964 | Keller | 426/126 |
| 3,148,070 | 9/1964 | Mishkin et al. | 426/386 |
| 3,183,096 | 5/1965 | Hiscock | 99/77.1 |
| 3,314,591 | 4/1967 | Cheeley | 426/410 |
| 3,373,043 | 3/1968 | Rubenstein | 99/77.1 |
| 3,603,454 | 9/1971 | Raaf | 206/205 |
| 3,625,704 | 12/1971 | Andre et al. | 99/66 |
| 3,700,388 | 10/1972 | Johnson et al. | 53/183 |
| 3,769,032 | 10/1973 | Lubsen et al. | 99/65 |
| 3,783,163 | 1/1974 | Patel | 426/221 |
| 3,840,680 | 10/1974 | Schmidt et al. | 426/126 |
| 3,890,448 | 6/1975 | Ito | 426/126 |
| 3,935,810 | 2/1976 | Milano | 426/113 |
| 4,034,116 | 7/1977 | Hammell et al. | 426/106 |
| 4,214,029 | 7/1980 | Barnes | 426/126 |
| 4,308,084 | 12/1981 | Ohtusuki et al. | 156/233 |
| 4,310,578 | 1/1982 | Katsura et al. | 428/35 |
| 4,333,601 | 6/1982 | Grimm | 426/126 |

FOREIGN PATENT DOCUMENTS

| | | | |
|---|---|---|---|
| 1460 | 4/1979 | European Pat. Off. | 426/124 |
| 2411310 | 9/1975 | Fed. Rep. of Germany | 426/398 |
| 5488476 | 7/1979 | Japan . | |
| 1206047 | 9/1970 | United Kingdom | 426/316 |

OTHER PUBLICATIONS

Modern Packaging Encyclopedia, 7/1968, vol. 41, #7A, McGraw Hill.
Modern Packaging Encyclopedia, 7/1971, vol. 44, #7A, McGraw Hill.
Principles of Food Packaging, 1970, R. Heiss, Food & Agricul. Org. of U.N.
Coffee Processing Technology, vol. 1, pp. 571-573, 576-578, Sivetz et al., Avi Publ., 1963.

Primary Examiner—Steven Weinstein
Attorney, Agent, or Firm—Richard C. Witte; John V. Gorman; E. Kelly Linman

[57] ABSTRACT

In combination, a predetermined quantity of particulate soluble beverage product, a predetermined quantity of aroma oil containing aromatic volatiles and a flexible air-tight packet for housing said particulate beverage product and said aroma oil for an extended period of time without substantial degradation in the quality or substantial decrease in the quantity of aromatic volatiles present in said aroma oil and said beverage product. In a particularly preferred embodiment the particulate soluble beverage product comprises instant coffee and the aroma oil comprises coffee aroma oil. Said packet preferably comprises at least two layers of a flexible sheet material which is substantially impervious to the passage of gas and liquid, said flexible sheet material having at least one surface which is substantially inert to the aromatic volatiles contained in said coffee aroma oil and said particulate soluble coffee product. The layers of flexible sheet material are superposed on one another so that said coffee aroma oil and said particulate soluble coffee product contained intermediate said layers contacts only the substantially inert surfaces of said sheet material. The layers are continuously secured to one another about their periphery to form a gas and liquid-impervious seal surrounding and totally enclosing said coffee aroma oil and said particulate soluble coffee product.

13 Claims, 7 Drawing Figures

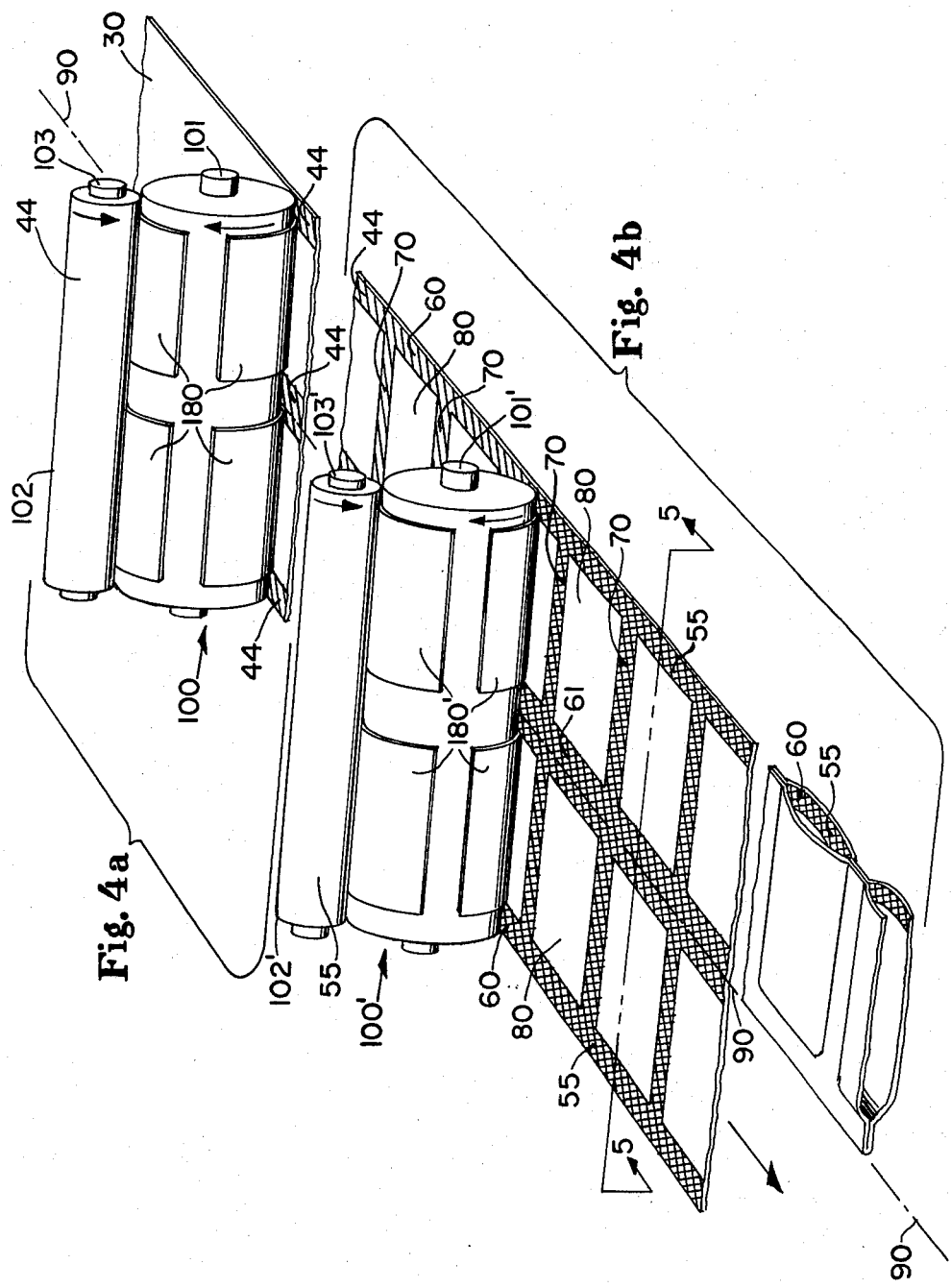

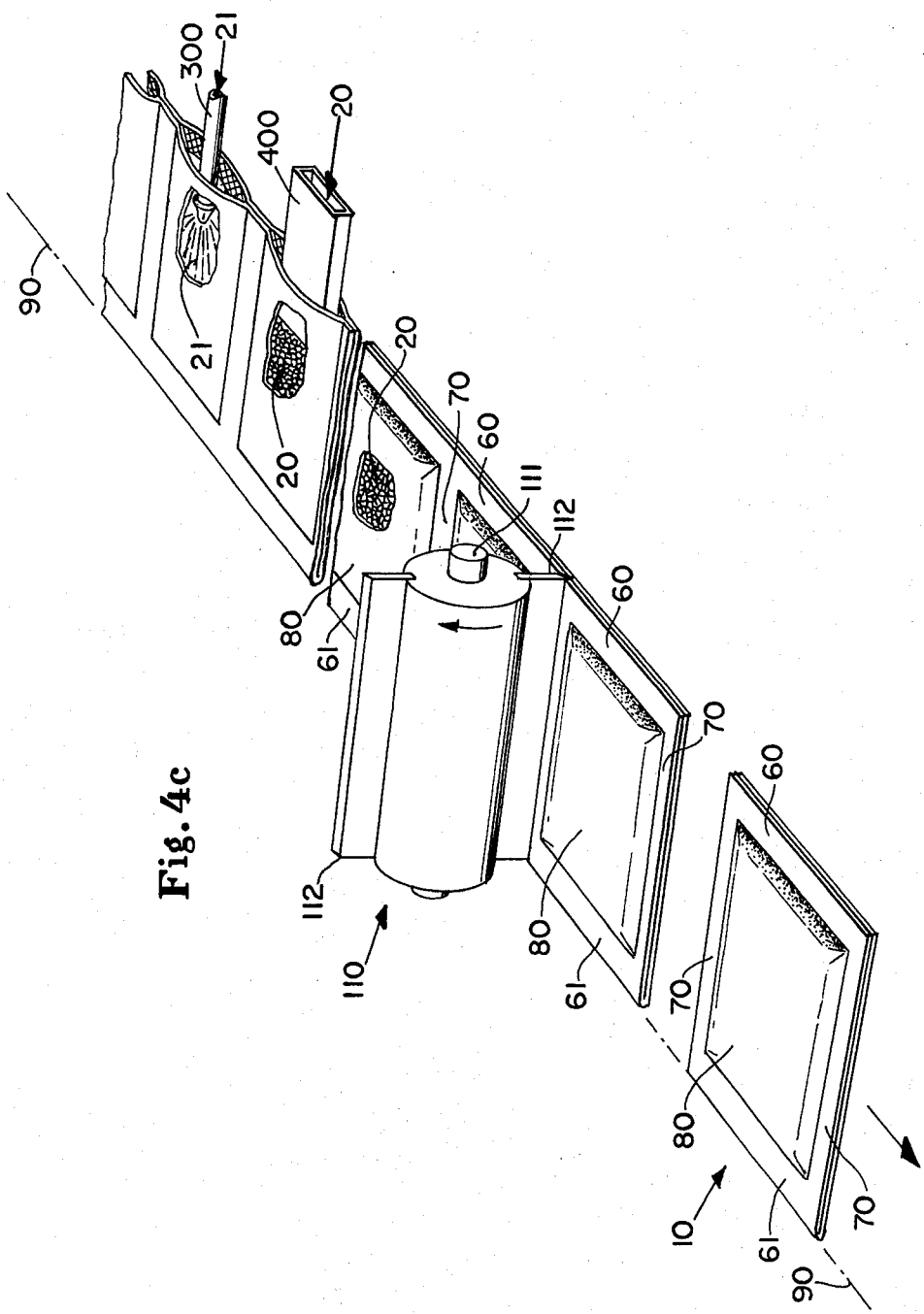

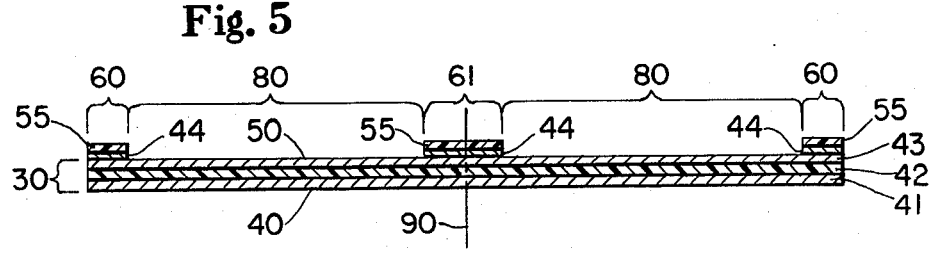
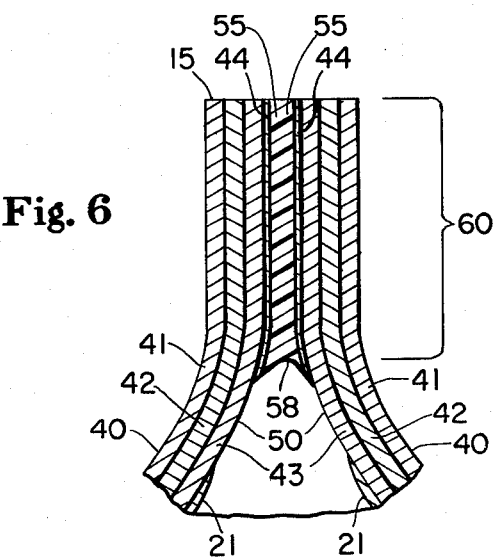

INSTANT COFFEE CONTAINING PACKET AND METHOD OF FORMING

TECHNICAL FIELD

The present invention relates to a flexible shelf stable packet preferably containing coffee aroma oil and particulate soluble, i.e., instant, coffee which, when opened by the consumer, will yield an aroma impact comparable to that normally associated with ground coffee. In a particularly preferred embodiment, the packet is comprised of a plastic foil laminate having bare foil as the product-contacting surface. The packet is preferably sealed along three sides, injected with a predetermined quantity of coffee aroma oil, filled with a predetermined quantity of particulate soluble coffee, and thereafter sealed under an inert gas atmosphere along its open side. The flexible packets thus formed are preferably fabricated from a continuous web of the laminate packaging material, the foil surface of which has been pattern printed with a layer of heat sealable polymer to form a continuous seal about each packet's contents. To ensure positive control of the forming, aromatizing, filling and sealing operations the packets are severed from the continuous web only after the last sealing operation has been completed.

BACKGROUND ART

The impact of packaging materials on the product contained has for some time been recognized when dealing with brew-in packets of the type utilized with beverages such as coffee and tea. In particular, U.S. Pat. No. 1,247,906 issued to Tully on Nov. 27, 1917, discloses a tea-ball for marketing and brewing tea. The ball is made in two sections of paper or similar material. In order that the tea-ball may withstand hot or boiling water, each section is coated with a waterproofing, heat-resisting and cementitious substance, preferably a solution of cellulose acetate. The coating is chosen so that it will not affect the taste or quality of the beverage brewed when the ball is immersed in hot water.

Similarly, U.S. Pat. No. 3,183,096 issued to Hiscock on May 11, 1965, discloses a porous brew-in packet for ground coffee made from synthetic filter paper designed not to damage the natural aroma and flavor of coffee nor impart any false flavor or taste or odor to the brewed coffee. According to the teachings of Hiscock, prior art efforts to adapt tea bag materials to package coffee were generally not successful since they failed to recognize that such materials would contribute to and accelerate the deterioration of coffee packed therein through acting as oxygen carriers. By way of contrast, the paper employed by Hiscock is preferably a porous synthetic fiber paper comprised of single filament polymeric fibers selected from the group consisting of nylon, polyesters, and acrylics bonded together by a taste-free, non-toxic dispersed polymer having a melting point in excess of the boiling point of water and substantially lower than the melting point of the polymer fibers which it bonds. The paper of the packet has its edges heat sealed at a temperature above the melting point of the dispersed binding polymer and below the melting point of the polymer fibers.

U.S. Pat. No. 3,373,043 issued to Rubenstein on Mar. 12, 1968, discloses a porous paper brew-in package for fresh coffee which is sized with a harmless water soluble material such as vinyl acetate acrylate copolymer to make it air impervious. According to Rubenstein, the package is heat sealed about its edges and, prior to brewing, protects the coffee from the atmosphere. During brewing, the water soluble sizing is dissolved and permits normal brewing to occur. After brewing, the entire package may be disposed of.

Finally, U.S. Pat. No. 2,805,164 issued to Doppler discloses a package in which finely ground coffee beans can be sold. The package is so formed that it holds the coffee air-tight so that it will keep its original quality, even though ground, and when properly opened the container will itself serve as a filtering medium, so that for the preparation of a cup of coffee all one needs do is to pour boiling water into the container and let liquid coffee drip out at the bottom. The outside of the package is formed from a layer of metal foil such as aluminium or tin foil which is preferably made in one piece and is bent along the crease line to form a square having foil on each face. The edges of the foil other than the bent edge formed at the crease line are sealed together, and in one corner the foil layers are pressed tightly together so that this corner may be readily identified as the corner to be torn off. Between the layers of foil a layer of filter paper is provided to encapsulate the ground coffee. The layers of foil are tightly sealed around their edges as by an adhesive or heat sealing or the like to produce a package which will be airtight to retain the good qualities of the coffee. When opened, the package will be in the form of a filter with the foil acting as a watertight funnel and the inner paper layer acting as a filter medium.

As will be appreciated by those skilled in the art, ground coffee products of the type disclosed in the aforementioned references have substantial naturally occurring aroma. Most instant coffee products, on the other hand, do not have significant naturally occurring aroma due to the manner in which they are processed. The lack of aroma impact when opening gas and moisture impervious containers of instant coffee product is extremely pronounced when dealing with relatively small individual serving style packets which are typically comprised of gas and moisture impervious flexible packaging films. To offset this initial lack of aroma impact, the aroma of instant coffee products is typically enriched by the addition of an aromatized oil such as coffee aroma oil thereto prior to or concurrent with packaging.

Particularly preferred method and apparatus for enriching the aroma of edible oils such as coffee oil and for enriching the aroma of instant coffee products using said aroma enriched oils are generally disclosed in the following commonly assigned patents which are hereby incorporated herein by reference: U.S. Pat. No. 3,625,704 issued to Andre et al. on Dec. 7, 1971; U.S. Pat. No. 3,769,032 issued to Lubsen et al. on Oct. 30, 1973; and U.S. Pat. No. 3,783,163 issued to Patel on Jan. 1, 1974. A particularly preferred method of enriching the initial aroma impact of individualized serving packets of instant coffee is disclosed in greater detail in the commonly assigned, co-pending patent application of Sally W. Reade, George D. Brown, Russell E. Parker and James E. Vogel entitled Single-serving Packets of Aromatized Instant Beverage, Ser. No. 183,491, filed Sept. 2, 1980 and hereby incorporated herein by reference.

In the method disclosed in the aforementioned patent application of Reade et al., a single serving packet comprised of gas and moisture impervious flexible packaging film and preferably having a product-contacting surface comprised of heat sealable film is formed by folding a continuous web about its longitudinal centerline, heat sealing the edges intermediate adjacent packets in said web, and spraying the interior surfaces of the three-sided packets thus formed with coffee aroma oil prior to addition of the soluble instant coffee product thereto. The packets are thereafter sealed at their open edge, preferably under an inert gas atmosphere, and cut from the continuous web to form individual serving packets. An object of the aforementioned patent application of Reade et al. is to provide a single serving packet of aroma enriched instant coffee product which has an improved initial aroma impact when opened without, at the same time, producing the appearance of oil on the beverage formed utilizing the product contained in the package.

It will be appreciated that instant coffee products of the type disclosed in the aforementioned patent application of Reade et al. are not packaged in brew-in packets, since the instant coffee is removed from the packet and completely dissolved in hot water to form the coffee beverage. Since the foil laminate materials disclosed in the application of Reade et al. are known to have good gas and moisture barrier properties, it was highly unexpected that the desired coffee aroma impact was not always present when packages of the aforementioned type were opened, even when a substantial quantity of coffee aroma oil had been added thereto prior to sealing. In further investigating this phenomenon it was observed that the intensity of the coffee aroma, as measured organoleptically, decreased noticeably over a period of a few weeks. Furthermore, gas chromotagraph readings taken of the head space of such packets revealed a substantial loss of certain of the volatile aromatic constituents from the packets only a few hours after sealing. These investigations led to the discovery that the volatile aromatic constituents were either absorbed or adsorbed by the heat sealable polymer utilized as the product-contacting layer in the gas and moisture-impervious packaging films from which the individual packets were formed.

Further investigation has revealed that not all heat sealable polymers react identically in this regard. The reaction of some heat sealable polymers proved to be adverse, while the reaction of other heat sealable polymers proved to be imperceptible under test exposures of approximately two weeks duration. Nonetheless, due to variations in product and aroma oil quality, packaging materials and conditions of storage, it is difficult to reliably predict which polymers will prove to be substantially inert to the aromatic volatiles over extended periods of time.

Accordingly, it is an object of the present invention to provide a flexible packet containing instant coffee product and coffee aroma oil which will present a high coffee aroma impact to the consumer upon opening, even after an extended shelf life in said flexible packet, without at the same time producing the appearance of oil on the beverage formed utilizing the product contained in the package.

DISCLOSURE OF THE INVENTION

In a particularly preferred embodiment, the present invention comprises in combination, a particulate instant coffee product, a predetermined quantity of coffee aroma oil containing a high concentration of aromatic volatiles and a flexible gas and moisture impervious packet for housing said particulate instant coffee product and said coffee aroma oil for an extended period of time without substantial degradation in the quality or substantial decrease in the quantity of the aromatic volatiles contained in said coffee aroma oil and said instant coffee product. Said packet preferably comprises two layers of a flexible sheet material which is substantially impervious to the passage of gas and liquid, said flexible sheet material having a product-contacting surface which is substantially inert to the aromatic volatiles contained in said coffee aroma oil and said instant coffee product. The layers of flexible sheet material are superposed on one another so that the particulate instant coffee product and the coffee aroma oil contained in said packet contact those surfaces of the sheet material which are substantially inert to the aromatic volatiles. The layers are continuously secured to one another about the periphery of the inert surfaces to form a gas and liquid impervious seal surrounding and totally enclosing the particulate soluble coffee product and the coffee aroma oil.

BRIEF DESCRIPTION OF THE DRAWINGS

While the specification concludes with claims particularly pointing out and distinctly claiming the present invention, it is believed the present invention will be better understood from the following description in which:

FIGS. 4a through 4c are schematic perspective illustrations of particularly preferred packet forming, aroma enriching and packet filling operations of the present invention;

FIG. 5 is an enlarged cross-sectional illustration of the laminate web disclosed in FIG. 4b, taken along section line 5—5 of FIG. 4b; and FIG. 6 is an enlarged cross-sectional illustration of the uppermost seal portion of the packet generally illustrated in FIG. 2.

DETAILED DESCRIPTION OF THE INVENTION

Figure 1:
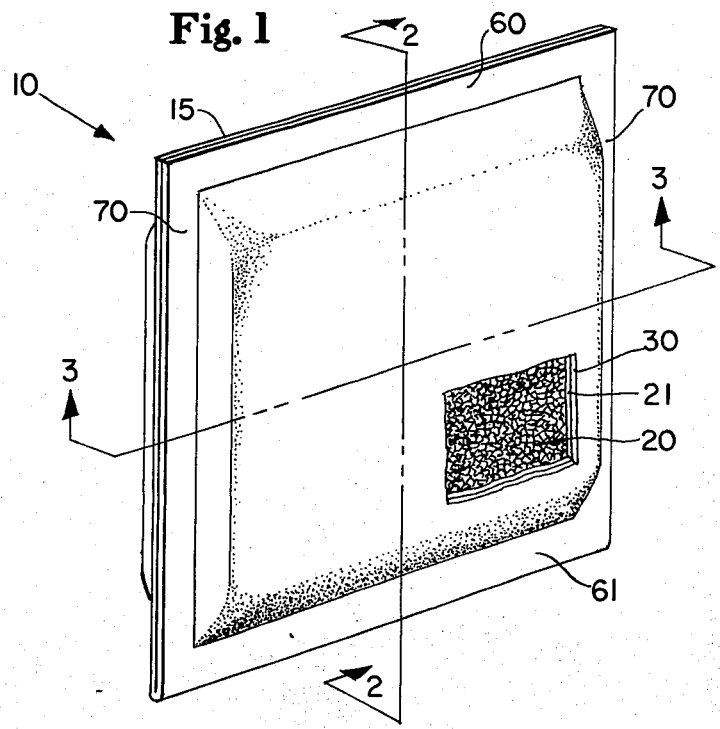
FIG. 1 is a perspective view of a preferred packet containing particulate instant coffee product and coffee aroma oil in accordance with the present invention.

A particularly preferred combination of elements 10 comprising the present invention is generally disclosed in FIG. 1. In particular, the combination comprises a sealed flexible packet 15 containing a predetermined quantity of particulate instant coffee 20 and a predetermined quantity of coffee aroma oil 21. The packet 15 is comprised of two layers of a gas and moisture impermeable flexible laminate packaging material sealed about their periphery so as to provide a gas and moisture resistant container for the coffee aroma oil 21 and the instant coffee product 20 housed therein. In the FIG. 1 embodiment, the laminate packaging material 30 is comprised of a single web which is folded about its longitudinal center line 90, as generally disclosed in the cross-section of FIG. 2 and the schematic processing illustrations of FIGS. 4a through 4c.

As is described in detail in the aforementioned commonly assigned co-pending patent application of Reade et al., Ser. No. 183,491, the lateral edge seals of each packet are preferably formed by folding a continuous web of laminate material about its longitudinal centerline. Since these webs exhibit a continuous heat sealable innermost surface, the discrete packets of Reade et al. are formed by heat sealing the folded layers to one another at predetermined points along the length of the folded web to form a three-sided pouch into which a predetermined quantity of coffee aroma oil is sprayed. A predetermined quantity of particulate instant coffee product is thereafter inserted into the pouch and the uppermost edge is thereafter sealed, preferably under an inert gas atmosphere.

Certain of the operations disclosed in the aforementioned application of Reade et al. are similar to those disclosed herein, i.e., the lateral edge seals 70 are formed by folding a continuous web of laminate material 30 about its longitudinal centerline 90 and joining the innermost surfaces 50 of the web 30 to one another at said areas. To improve resistance to flex cracking a lowermost seal 61 is preferably made at the same time as lateral edge seals 70. Coffee aroma oil 21 is applied to the product-contacting surfaces 80 of the innermost surfaces 50 of the interconnected web of pouches 15, the pouches are filled with a predetermined quantity of particulate instant coffee product 21, and the open edges of the pouches are thereafter sealed to one another as at 60.

However, Reade et al. does not teach the pattern printing operations disclosed in FIGS. 4a and 4b to provide a flexible, gas and moisture impermeable packet having oil and product-contacting surfaces 80 which are substantially inert to the volatile aromatic constituents present in either the coffee aroma oil or the particulate instant coffee product.

FIG. 5 is a cross-sectional illustration of a particularly preferred laminate web 30 of the present invention after a patterned layer of primer 44 and an identically patterned layer of heat sealable polymer 55 have been imprinted thereon generally in accordance with the process schematically illustrated in FIGS. 4a and 4b. It will be appreciated by those skilled in the art that the particular composition of the laminate web is not critical to the practice of the present invention, provided that it offers suitable resistance to the passage of moisture and gas and further provided that its product contacting surfaces 80 are substantially inert to the volatile aromatic constituents present in either the coffee aroma oil or the particulate instant coffee product.

In the particularly preferred embodiment of the present invention schematically disclosed in FIGS. 1-6, the laminate web 30 comprises a layer of paper 41 which forms the exterior surface 40 of the web, a layer of low density polyethylene 42 bonded to the interior surface of the paper layer 41, and a layer of aluminum foil 43 bonded to the interior surface of the low density polyethylene 42. In a particularly preferred embodiment, the layer of aluminum foil is on the order of about 0.35 mils or greater in thickness, the layer of low density polyethylene 42 is approximately 0.5 mils thick and the paper layer 41 is approximately 1.75 mils thick.

As has been pointed out earlier herein, the enhanced coffee aroma impact upon opening is preferably imparted to individual servings of particulate instant coffee product packaged in high barrier flexible packets 15 by coating the interior surfaces of the packet with coffee aroma oil 21 prior to insertion of the particulate instant coffee product 20 and sealing of the container.

However, to eliminate or at least minimize the deleterious effect of the heat sealable polymer on the highly volatile aromatic constituents contained in the coffee aroma oil 21 and the coffee product 20, the web embodiment 30 illustrated in FIG. 5 has been pattern printed to provide a heat sealable polymer 55 only in those areas of the packet which are ultimately sealed to one another to provide a moisture and gas impervious barrier, i.e., areas 60, 61 and 70. The oil and product-contacting surfaces 80 are preferably comprised of bare aluminum foil which is substantially inert to the volatile aromatic constituents contained in the coffee aroma oil and the particulate soluble coffee product.

Due to the tendency of exposed aluminum foil to oxidize rapidly, it is preferable that the heat sealable polymer 55 be pattern printed onto the surface of the foil immediately after its manufacture to ensure adherence of the polymer to the foil. If the heat sealable polymer 55 is not applied immediately after manufacture of the foil, it is generally necessary to apply a primer coat 44 to the surface of the foil immediately after its manufacture, or the oxidation which occurs on the exposed foil will inhibit subsequent adhesion of the heat sealable polymer. To minimize the possibility of the primer coat adversely affecting any of the aromatic volatiles contained in the coffee aroma oil or the particulate soluble coffee product it is also preferable to pattern print the primer onto the web 30.

One such pattern printing operation is schematically illustrated in FIGS. 4a and 4b. In particular, an oxidation resistant primer coat 44, which is preferably comprised of a solvent-based polyvinylchloride, is pattern printed onto the web 30 to provide a coating thickness of approximately 0.007 mils. In the embodiment disclosed in FIGS. 4a and 4b, the primer is applied only in those areas where the heat sealable polymer 55 is to be subsequently applied. In the event the primer is applied across the entire surface of the web, care must be exercised in its selection to ensure that the primer is substantially inert to the aromatic volatiles contained in the coffee aroma oil and the soluble coffee product.

After the primer 44 has been dried, as by the application of forced hot air, the web may, if desired, be wound onto a roll and stored for an extended period before it is subjected to a second pattern printing operation which is in register with said first pattern printing operation. In the second pattern printing operation a heat sealable polymer layer 55 is applied to the surface of the web 30 only in those areas coinciding with the primer layer 44. The thickness of the polymer layer 55 must be sufficient to provide a gas-tight seal when the opposing portions of the web 30 are heat sealed to one another. It should be noted, however, that polymer layers which are excessively thick may prove undesirable, since they needlessly increase the cost of the package. In addition, they make winding and unwinding of the web more difficult due to greater disparities in thickness across the width of the web. Furthermore, they expose a greater total volume of the heat sealable polymer material to the aroma oil and the soluble coffee product about the periphery of the packet. Experience has demonstrated that applying a heat sealable polymer layer 55 having a thickness in the range of about 0.75 mils and about 1.25 mils to the web 30 is generally preferred.

Polyethylene vinyl acetate-based hot melt adhesives are particularly preferred for use as heat sealable polymer 55. Specific hot melt adhesives found suitable include National Adhesives INSTANT-LOK ® 34-2912, as available from National Starch and Chemical Corporation of Bridgewater, N.J., and UPACO ® No. 9240-2, as available from Upaco Adhesives Inc. of Nashua, N.H.

As a result of the primer and polymer printing operations schematically shown in FIGS. 4a and 4b, the resultant web exhibits a continuous film of heat sealable polymer 55 in areas 60, 61 and 70 and bare foil in the non-coated areas 80 which form the contact surfaces for the coffee aroma oil 21 and the particulate instant coffee product 20 to be housed in the packets 15.

While the pattern printing operations can be carried out by any means well known in the art, these are schematically illustrated in FIGS. 4a and 4b in terms of a gravure printing roll 100 which rotates about shaft 101 and which applies a coating of primer 44 in all but the non-recessed areas 180 located on the periphery of the roll. The recessed areas of roll 100 are filled with a continuous coating of liquid primer 44 by means of a feed roll 102 rotating about shaft 103, while the non-recessed areas 180 are wiped clean by means of a conventional doctor blade (not shown) prior to the roll's contacting the web. The feed roll 102 is coupled to conventional primer supply means well known in the art (and therefore not shown). Once the primer has been applied to the bare aluminum foil surface of the web and dried, the web may be stored for extended periods, as desired, without further oxidation of the foil in the pattern printed areas 60, 61 and 70.

Subsequent to the primer printing operation, the web is subjected to a second pattern printing operation which is preferably carried out in register with the first. This is schematically illustrated in FIG. 4b. A second printing roll 100' rotates about shaft 101' and applies a coating of heat sealable polymer 55 in all but the non-recessed areas 180' located on the periphery of the roll. The recessed areas of roll 100' are supplied with a continuous coating of heat sealable polymer 55 by means of a feed roll 102' rotating about shaft 103', while the non-recessed areas 180' are wiped clean by means of a conventional doctor blade (not shown) prior to the roll's contacting the web. The feed roll 102' is coupled to conventional polymer supply means well known in the art (and therefore not shown).

After the registered printing operations schematically disclosed in FIGS. 4a and 4b have been completed, the laminate web 30 is folded about its longitudinal centerline 90 and a seal is effected in areas 61 and 70 to provide a continuous web of interconnected three-sided packets 15. The uppermost edge portion of the packets 15 is thereafter opened, the oil and product-contacting surfaces 80 are preferably sprayed with a coating of coffee aroma oil 21 by means of a reciprocating spray nozzle 300, and a predetermined amount of particulate instant coffee product 20 is inserted therein under an inert gas atmosphere by means of a reciprocating filler nozzle 400. The final seal 60 is thereafter effected, preferably under an inert gas atmosphere. The continuous web is finally severed into individual aroma-enriched, oil-filled and sealed packets by means of a cutting cylinder 110 having opposed cutting blades 112 mounted at its periphery and spaced so as to coincide with the length of each individual packet.

Details of the foregoing folding, sealing, oil coating, filling and cutting operations are more fully described in the aforementioned copending patent application of Reade et al., which is incorporated herein by reference.

Figure 2:
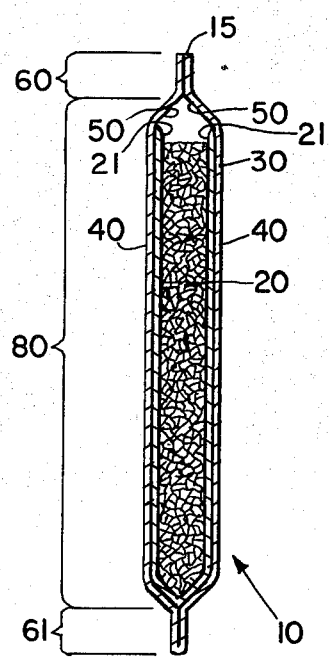
FIG. 2 is a cross-sectional segment of the packet disclosed in FIG. 1, taken along section line 2—2 of FIG. 1.
Figure 3:
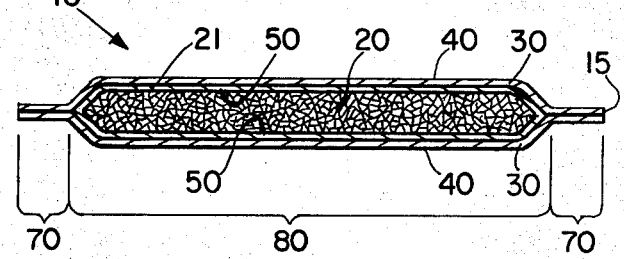
FIG. 3 is a cross-sectional illustration of the packet shown in FIG. 1 taken along section line 3—3 of FIG. 1.

As can be seen in FIGS. 2, 3 and 6, only the non-coated surfaces 80 of the web 30 and the innermost edge 58 of the peripheral seal about the packet 15 have any contact with the coffee aroma oil 21 and the particulate instant coffee product 20 contained within the packet. FIG. 6, which is an enlarged view of the uppermost portion of the packet shown in FIG. 2, illustrates the manner in which the uppermost seal in areas 60 is made. In particular, the heat sealable polymer 55 on one edge of web 30 is brought into contact with the heat sealable polymer 55 on the opposite edge of the web. When heat and pressure are applied to the exterior surfaces of the packet 15, the oppositely disposed layers of heat sealable polymer 55 are caused to fuse together, as generally shown in FIG. 6. A similar fusing takes place in areas 61 and 70. Thus, the area of contact between the coffee aroma oil 21, the particulate instant coffee product 20 and the heat sealable polymer 55 is limited to the exposed edge 58 of the fused seal, which is substantially continuous about the entire periphery of the sealed packet 15.

While particular embodiments of the present invention have been illustrated and described, it will be obvious to those skilled in the art that various changes and modifications can be made without departing from the spirit and scope of the invention. For example, the invention disclosed herein may be employed to advantage in packaging particulate products other than instant coffee, which products either have substantial naturally occurring aroma or which products have had their aroma enriched by addition of an aroma oil or the like. It is intended to cover in the appended claims all such modifications that are within the scope of this invention.

What is claimed is:

1. In combination, a predetermined quantity of particulate soluble coffee product, a predetermined quantity of coffee aroma oil containing aromatic volatiles and a flexible gas and moisture impermeable packet for housing said particulate soluble coffee product and said coffee aroma oil for an extended period of time without substantial degradation in the quality or substantial decrease in the quantity of aromatic volatiles present in said coffee aroma oil and said soluble coffee product so as to present a high coffee aroma impact to the consumer upon opening, said packet comprising at least two layers of a flexible laminate packaging material which is substantially impervious to the passage of gas and moisture, said flexible laminate packaging material comprising an outer layer of paper, an intermediate layer of low density polyethylene bonded to said layer of paper, and an inner surface layer of aluminum foil bonded to said low density polyethylene, said aluminum foil being substantially inert to the aromatic volatiles contained in said coffee aroma oil and said particulate soluble coffee product, said layers of flexible laminate packaging material being superposed on one another so that said coffee aroma oil and said particulate soluble coffee product contained intermediate said layers contact substantially only bare aluminum foil surfaces, said coffee aroma oil being coated onto said bare aluminum foil surfaces, said layers of flexible laminate packaging material being continuously secured to one another about their periphery to form a substantially gas and moisture impervious seal surrounding and totally enclosing said coffee aroma oil and said particulate soluble coffee product.

2. The combination of claim 1, wherein said packet is formed by folding a web of said flexible laminate packaging material along a fold line so that said substantially inert aluminum foil surfaces are oriented in face-to-face relation with one another.

3. The combination of claim 2, wherein said continuous securement of said layers of flexible laminate packaging material to one another comprises said fold line and a continuous fused bead of heat sealable polymer originating from a first point on said fold line, extending about the exposed periphery of said coffee aroma oil and said particulate soluble coffee product and terminating at a second point on said fold line which is remote from said first point.

4. The combination of claim 3, wherein said heat sealable polymer is comprised of a polyethylene vinyl acetate-based hot melt adhesive.

5. The combination of claim 4, wherein each of said layers of aluminum foil includes a layer of oxidation resistant primer intermediate said aluminum foil surface of said flexible laminate packaging material and said layer of heat sealable polymer.

6. The combination of claim 5, wherein said layer of oxidation resistant primer is comprised of a solvent-based polyvinylchloride.

7. The combination of claim 6, wherein said flexible laminate packaging material is comprised of a layer of paper approximately 1.75 mils thick, a layer of low density polyethylene approximately 0.5 mils thick bonded to said layer of paper, and a layer of aluminum foil approximately 0.35 mils thick bonded to said layer of low density polyethylene.

8. A method for forming a shelf stable flexible particulate soluble coffee product packet which will not substantially degrade the quality or substantially decrease the quantity of aromatic volatiles contained in a predetermined quantity of coffee aroma oil and a predetermined quantity of particulate soluble coffee product housed in said packet so as to present a high coffee aroma to the consumer upon opening, said method comprising the steps of:

a. pattern printing a heat sealable polymer layer onto the oil and product contacting surface of a continuous laminate web, said entire product contacting surface of said web comprising substantially only bare aluminum foil surfaces which are substantially inert to the aromatic volatiles contained in said coffee aroma oil and said particulate soluble coffee product, said heat sealable polymer layer being applied outside the areas of contact between said coffee aroma oil and said particulate soluble coffee product and said bare aluminum foil surfaces;

b. folding said laminate web about its longitudinal centerline so that the unprinted aluminum foil product contacting areas of said web face one another;

c. applying heat and pressure at predetermined points along the length of said laminate web to seal the opposing layers of heat sealable polymer to one another and form a continuous web of three-sided pouches;

d. applying a predetermined quantity of coffee aroma oil to the unprinted aluminum foil product contacting surfaces of said pouch;

e. inserting a predetermined quantity of said particulate soluble coffee product into each of said pouches; and f. closing and sealing the open side of said pouches to form said packets by applying heat and pressure to the opposing layers of heat sealable polymer.

9. The method of claim 8, including the step of severing said filled and sealed packets from said continuous web.

10. The method of claim 8 wherein said layer of heat seable polymer has a thickness of at least about 0.75 mils.

11. The method of claim 10 wherein said heat sealable polymer layer has a maximum thickness of about 1.25 mils.

12. The process of claim 8, wherein an oxidation-resistant primer layer is applied to said substantially inert surface of said web prior to the application of said heat sealable polymer thereto.

13. The method of claim 12, wherein said oxidation-resistant primer layer and said heat sealable polymer layer are applied in identical patterns in register with one another.

* * * * *

UNITED STATES PATENT OFFICE
CERTIFICATE OF CORRECTION

PATENT NO. : 4,478,858
DATED : October 23, 1984
INVENTOR(S) : James C. Baird; Cornelis H. Japikse; Richard F. Kussin It is certified that error appears in the above-identified patent and that said Letters Patent are hereby corrected as shown below:

On the first page of the patent, below the "ABSTRACT", delete "7 Drawing Figures" and insert therefor
--- 8 Drawing Figures ---.

Claim 12, Column 10, lines 36 and 37, delete "substantially inert surface of said web" and insert therefor
--- aluminum foil surfaces of said laminate web ---.

Signed and Sealed this

Seventh Day of May 1985

[SEAL]

Attest:

DONALD J. QUIGG

Attesting Officer     Acting Commissioner of Patents and Trademarks